US008065976B1

(12) United States Patent  (10) Patent No.: US 8,065,976 B1
Bryant et al.  (45) Date of Patent: Nov. 29, 2011

(54) CATTLE FEEDING SYSTEM AND SHELTER TO CREATE A CONTROLLED ENVIRONMENT WITHIN THE THERMAL NEUTRAL ZONE

(76) Inventors: Robert E. Bryant, Aurelia, IA (US); Brent Bryant, Columbia, MO (US)

( * ) Notice: Subject to any disclaimer, the term of this patent is extended or adjusted under 35 U.S.C. 154(b) by 595 days.

(21) Appl. No.: 12/128,182

(22) Filed: May 28, 2008

Related U.S. Application Data

(63) Continuation-in-part of application No. 11/370,971, filed on Mar. 8, 2006, now abandoned.

(51) Int. Cl.
*A01K 1/00* (2006.01)
*A01K 1/10* (2006.01)
(52) U.S. Cl. .................................. 119/449; 119/436
(58) Field of Classification Search .................. 119/436, 119/437, 444, 448, 449, 482; 135/121, 122, 135/87, 158; 52/66, 73
See application file for complete search history.

(56) References Cited

U.S. PATENT DOCUMENTS

| | | |
|---|---|---|
| 0,596,804 A | 1/1898 | Busch |
| 1,745,588 A | 2/1930 | Shodron |
| 2,626,591 A | 1/1953 | Mazur et al. |
| 2,842,096 A | 7/1958 | Bradfield |
| 3,885,524 A | 5/1975 | Gregory |
| 4,060,054 A | 11/1977 | Blair |
| 4,222,347 A | 9/1980 | Bunger |
| D262,826 S | 1/1982 | Bunger |
| 4,428,278 A | 1/1984 | Sutton, Jr. |
| 4,773,191 A | 9/1988 | Slack |
| 5,136,980 A | 8/1992 | Schoeber et al. |
| 6,073,587 A | 6/2000 | Hill et al. |
| 2005/0235922 A1 | 10/2005 | Bryant |

FOREIGN PATENT DOCUMENTS

| | | |
|---|---|---|
| GB | 2 071 983 A | 9/1981 |
| WO | WO/01/67851 | 9/2001 |

OTHER PUBLICATIONS

Shouse et al., "Hoop Barns for Beef Cattle", Agricultural Engineers Digest, AED 50, published Sep. 2004 (15 pages.).
Kammel, "Hoop Barns for Dairy Cattle", Agricultural Engineers Digest, AED 51, published Sep. 2004 (16 pages).

*Primary Examiner* — Son T Nguyen
(74) *Attorney, Agent, or Firm* — Ryan N. Carter (57) ABSTRACT

An improved cattle feeding system and shelter to maintain cattle in their thermo neutral zone. The shelter has a building foundation frame extending upwardly from the ground with an awning frame extending upwardly from the foundation frame and over it. This allows for an awning to be placed over the shelter frame to at least partially enclose it. The awning has a portion which is optionally opened to the south and optionally opened to the north to selectively allow air ventilation or catching the warmth of a southern sun exposure it also defines a chimney in the roof area and draft gap in the north wall. The awning also has a portion that can extend outwardly to the south, as well as retract. Vertically extendable and retractable awning closures are over the east and west ends of the frame to form selective entrances and exits. The entire system is built on a partial cement floor and a deep bedded area on a limestone pack and is of a configuration which enhances cleanliness inside of the shelter. The Drover's Alley allows cattle to be sorted and moved inside the shelter and to be restrained on the bedding pack while concrete alley is scraped.

11 Claims, 10 Drawing Sheets

CATTLE FEEDING SYSTEM AND SHELTER TO CREATE A CONTROLLED ENVIRONMENT WITHIN THE THERMAL NEUTRAL ZONE

CROSS-REFERENCE TO RELATED APPLICATIONS

This application is a Continuation-in-Part Application of U.S. Ser. No. 11/370,971 filed Mar. 8, 2006, herein incorporated by reference in its entirety.

FIELD OF THE INVENTION

This invention relates to a cattle feeding system and a shelter for use in that system.

BACKGROUND OF THE INVENTION

The present invention relates generally to a cattle feeding system and to a shelter used in that system to create a controlled environment that protects the beef animal from environmental extremes. It also is a system which minimizes pollution risks.

Conventional open cattle feedlots have fence-line feed bunks and a concrete apron in front of the bunk for the cattle to stand on while eating; but, the rest of the dirt feedlot is open to the sun, wind, snow, rain and resulting mud and wind chill. Conventional systems do not protect the beef animal from extreme weather stresses. The associated stresses from the conventional beef system lead to decreased feed efficiency, lower weight-gains, disease development, and higher death loss. In addition, the conventional system is more labor intensive, because the mud lots must be repeatedly scraped and dirt mounds built in an attempt to keep the animals out of the snow and mud. The feed bunks are in the open and unprotected from snow and rain. Snow and spoiled wet feed must be repeatedly scooped out of the bunk to keep the bunk dry. This increases labor expense.

A larger concern for conventional cattle feeding systems is the potential for polluting the environment with manure runoff from the open lots after a rain or snow melt. The Environmental Protection Agency (EPA) is enforcing new rules to prevent the pollution of streams and ditches next to conventional cattle feedlots and is requiring expensive containment basins or lagoons to be built to prevent run off from open feedlots. The result of lagoons and containment basins is the creation of an odor problem from the breakdown of the liquid manure that is contained in them. Consequently, the solution to water pollution creates air pollution. This trade off of one type of pollution for another is not acceptable.

As a result of many of these difficulties the cattle feeding business has moved away from the Midwest farm belt for among other reasons, in order to avoid the weather extremes since it is known that these weather extremes cause energy expenditure by the cattle and therefore decrease feed efficiency. For example, research at Kansas State University and the University of Nebraska has found that cattle that are in mud have wet hair and they are out of their thermo neutral temperature zone and thus have significantly lower rates of gain and poorer feed efficiency. Thermo neutral zone, as used herein, refers to a dry air area in for example a barn, that is within the range of 80° F. to 19° F. with the animals having dry hair. Within this range there is 15% better weight gain and feed efficiency. Disease is also notably lacking.

By way of example of the importance of the thermo neutral zone, as a general rule for every 4-8 inches of mud, weight gain is slowed by 14% and feed efficiency decreased by 13%. Severe conditions with mud 8-12 inches deep will decrease the gain and feed efficiency by 25% or more. In some instances cattle weight gain and feed efficiency has been cut in half by extreme muddy conditions.

In situations where the hair coat becomes wet cattle lose the ability to insulate themselves and as a result their maintenance requirements increase dramatically. Wind chill from the strong prevailing northwest winds also dramatically increases the animal's energy requirements.

The thermo neutral temperature zone is known to be the area or range of temperatures for maximum weight gain and feed efficiency. It also is the range of greatest comfort for cattle.

If the Midwest wishes to reestablish itself as the center for cattle feeding and finishing, there is a need for a successful structure that will maintain the cattle with dry hair generally within their thermo neutral temperature zone, i.e., between 80° F. on the upper end and 19° F. on the lower end. If the animals have wet hair the lower end thermal neutral zone temperature raises from 19° F. to 60° F. which dramatically increases energy requirements.

Certain types of systems have been developed in the past in an attempt to control climate and environment for cattle feeding systems. See for example, Slack, U.S. Pat. No. 4,773,191, which relates to a light and climate control system for pre-stressed fabric structures of the type having a plurality of arches in order to create certain zones within the shelter of controlled environment. There is, however, no control of feeding or design to eliminate or minimize manure and air pollution or is there adjustability to weather extremes. Bunger, U.S. Pat. No. 4,222,347, relates to a more permanent animal shelter for large scale feed operations involving a specifically designed roof and louver section with ventilation areas and use of interior feeding troughs. This too does nothing to eliminate some of the water and air pollution risk, nor does it allow flexibility of change in shelter structure to reflect change in environmental condition. It can therefore be seen by these two examples alone that there is a continuing need for improvement in large cattle feeding systems and shelters used in those systems to create a controlled environment depending upon the weather conditions, and to minimize pollution risk of both liquid and air pollution.

In the past, many types of structures have been suggested for increased efficiency. However the structure must not only work to maintain the cattle within the thermo neutral temperature range in dry comfortable air, but it also must be economical to build. For example, a 300-head barn that is of a conventional mono-slope barn construction runs about $700/head. A slatted floor confinement barn runs about $1,000/head for the same size herd. The present units of this invention, depending upon whether the farmer builds them himself or has help, range from $230/head for a 300-head barn to $330/head. Nearly half as much as conventional mono-slope barn at their very highest. Moreover they are more efficient than either mono-slope barns or slatted floors at maintaining dry air and a temperature in the thermo neutral zone.

A primary objective of the present invention is to develop a beef system that may be used to feed cattle in a controlled environment within their thermo neutral zone without the associated pollution of water and air that conventional cattle feeding systems create with their manure runoff.

Another objective of the present invention is to develop such a system which allows the walls of the shelter to be modified from opened to closed to partially closed positions and from positions providing shade protection to no shade protection, all in order to appropriately respond to seasonal climate changes as needed for the comfort of the cattle dwelling within the shelter.

A yet further objective of the present invention is to provide a cattle feeding system and a shelter which can be built relatively inexpensively in comparison with other units presently available commercially but which provides variable climate adjustments to maintain dry air, and herd cleanliness and comfort.

Simulating cattle feeding in a controlled environment is not an easy endeavor. Particularly in the Mid-West climates, which may typically range from winter wind chills approaching −35° F. to summer heat indexes of +114° F. Accordingly, it is a further objective of the present invention to provide a controlled environment that will modify the extreme weather fluctuations to a thermo neutral environment where the beef animal can thrive.

Open cattle feedlots are further complicated with humane animal husbandry criteria, such as providing access to bedding to provide a dry comfortable area for the cattle to lie on and to be protected from the sun, cold, wind, rain and mud. Accordingly, an even further objective of the present invention is to provide a cattle-feeding system that incorporates general humane, on farm husbandry standards for cattle.

Open cattle feedlots are often used by large commercial feedlots. These large feedlots are not typically inclined to use a controlled environment. A family farmer who owns the cattle, depends upon the farm for his/her livelihood, and provides the daily physical labor to manage the cattle and farm operation; such a person is more likely to adopt controlled environment, humane on-farm husbandry. Accordingly, it is a still further objective of the present invention to provide a cattle-feeding system, which may be easily adapted for a family farm, so that the family farm may generate a good and profitable livelihood.

Conventional cattle feeding systems usually have several hundred cattle in a pen and may not have adequate bunk and water space so that cattle, a herd animal, can all have easy access to water and feed. Accordingly, yet another objective of the present invention is to provide adequate space requirements for cattle if they are not in an open feedlot area but in an enclosed building structure. The present system generally provides 40 square feet per animal, with the feed bunk and water included, which is double the space of many current confined feeding systems on slatted floors.

It is a further objective to provide a system and shelter having a planned gated space area that allows a drover's alley so that the cattle can be conveniently penned in one area and the drover's alley cleaned easily all at once by simply moving a skid loader or appropriate working tool down through the shelter. Thereafter the drover's alley gates are opened and the cattle then allowed free access again to the drover's alley and the feeding area bunks.

A yet further objective of the present invention is to provide a shelter that has a north facing wall air gap that works in combination with the chimney vent space down through the roof middle (the long axis of the shelter known as a Chimney Vent or split) function together to keep air flowing up and out of the shelter that is therefore dry and avoids the efficiency bad weight gain affects (weight loss) of the adverse weather and high relative humidity.

Put simply, the shelter and system of the present invention provides the most cattle comfort, and the greatest feed efficiency and weight gain at the lowest cost. This is one of the most important objectives of the invention.

These and other objectives will become apparent from the following detailed written description of the invention, including the preferred embodiment and best mode of the invention.

BRIEF SUMMARY OF THE INVENTION

In accordance with the present invention, an improved cattle feeding system and shelter are provided that maintains the cattle within their thermo neutral zones, year around. The shelter has a building foundation frame extending upwardly from the ground with an awning frame extending upwardly from the foundation frame and over it. The awning frame allows for an awning to be placed over it to at least partially enclose the shelter. The awning has a portion which is optionally opened to the south and optionally opened to the north to selectively allow air ventilation, wind protection or catching the warmth of a southern sun exposure. A horizontal opening at times called a Chimney Vent is in the middle of the roof and functions with the north wall air gap to provide ventilation and dry air. The awning frame has a portion that extends outwardly to the south over the foundation frame to support an extendable and retractable awning that may hang over the south facing foundation frame to provide shade or be drawn up in a retracted position to allow the sun to enter for warmth. Vertically extendable and retractable awning closures are over the east and west ends of the frame to form selectively open and close entrances and exits. The entire system is built on a partial cement floor and a deep bedded area over a limestone pack in a configuration which enhances cleanliness inside of the shelter and minimizes pollution outside of the shelter. The feed bunk boards are held in a unique bracket system that allows easy repair and replacement.

DETAILED DESCRIPTION OF THE PREFERRED EMBODIMENT

The beef shelter system of the present invention creates a controlled environment that incorporates and utilizes the cattle's natural behavior and herd instincts. These behaviors and instincts include:

to seek shade away from summer sun;
to seek out wind protection to prevent wind chill;

to keep their hair coats dry (no snow or chilling rain);

to stay off frozen lumpy ground (no bruised hooves and lameness);

to stay out of the mud (no foot rot or hair damage);

to lie down on a dry bedding pack (no bruising or pressure sores);

to have easy access to feed;

to have easy access to water;

to be free from flies;

to stay in small groups;

to seek a quiet protected area to rest and ruminate;

to seek a concrete free area to stand (prevent hoof and leg stress); and to seek to defecate and urinate away from feed and water.

The shelter system has a roof over the entire cattle feeding area to prevent manure runoff resulting from rainfall or snow melt.

Certain constructional and operational features, both individually and in various combinations, are worthy of specific mention before describing in detail the specific construction shown in the drawings. These features emphasize the flexible uses of the system.

According to one feature of the invention, the system provides a roof over the entire cattle feeding area so that the manure can be handled in a dry state to prevent odor and runoff that are a result of liquid manure. The system also provides a roof over the entire cattle feeding area to provide shade from the summer sun and also provides a roof over the entire cattle feeding area to keep the cattle free from rain and snow to keep their hair coat dry. The system roof also prevents the wet conditions that contribute to hatching of fly eggs and the resultant fly problems for the cattle and the surrounding area. The system also uses a designed naturally ventilation air flow caused by a chimney split in the roof cover and a draft gap in the normally north facing wall. This results in removal of moist air and replacement with dry air.

According to another aspect of the present invention, it is worthy to note the structure does not have to be heated or insulated.

According to another aspect of the present invention, the frame structure is placed 10' above the floor on 6"×6"×14' posts anchored 4' in the ground. This allows for maximum ventilation and freedom from moisture condensing on the ceiling.

According to another aspect of the present invention, the frame structure as installed normally runs east and west in length and is open to the south. This allows the winter sun to stream in on the open 10' high south side. This allows the cattle to stand in the warm sunshine and keeps the 12' concrete pad along the feed bunk from freezing. In the summer time with the sun in its north axis, the cattle have complete shade and the 10' high south opening allows maximum ventilation.

Preferably, the frame system has a 5' rollup curtain on the west, north and east side that is down in the winter to prevent wind chill, and rolled up in the summer to allow maximum air movement due to Venturi Effect to prevent heat stress.

According to another aspect of the present invention, the system has a one foot opening in the top of the roof of the building (i.e. chimney split) to allow the heat and moisture to vent out the top. This will prevent steam and moisture from collecting in the hoop frame structure, especially when used with the normally north facing wall draft gap.

According to another aspect of the present invention, the shelter has a 4' awning as part of the roof on the south side that extends out over the feed bunk to prevent snow and rain from falling in the bunk and spoiling feed.

According to another aspect of the present invention, the shelter has two 16' wide×14' high rollup doors located on the west and east side of the building. This allows easy access to the structure for bedding the pens and for cleaning the pens.

According to another aspect of the present invention, the hoop frame shelter system uses steel 5' high double gate pipe gates to safely separate pens of cattle and to allow easy access to move cattle into and out of the structure.

According to another aspect of the present invention, the hoop frame shelter system has water tanks located in the structure so that all cattle have easy access to protected water.

According to another aspect of the present invention, the hoop frame shelter system has pens that are 80' wide to keep the cattle in small 80 head groups.

According to another aspect of the present invention, the hoop frame shelter system provides 1' of bunk space for each animal and the bunk is 3' wide to allow adequate feed capacity.

According to another aspect of the present invention, the hoop frame shelter system provide a 6" high step in front of the feed bunk to prevent dunging in the bunk. As well the feed bunk uses a unique bracket system to allow easy board replacement, if needed.

According to another aspect of the present invention, the hoop frame shelter system provides a 4' wide area of concrete that slopes away from feed bunk with a 2" slope that allows the cattle hoof action to scrape the manure down to the 8' level adjoining concrete slab.

According to another aspect of the present invention, the hoop frame shelter system provides an 8' wide area of level concrete between the 4' sloped concrete and the dry bedding pack. This level concrete (Drover's Alley) is easily cleaned with a tractor scraper to keep manure from building up in the structure. This concrete pad is scraped clean and the manure is removed from the building to the compost pile about once every 10 days. The Drover's Alley pen gating (see FIG. 10) and the rollup doors on the ends of the structure allow this to be a very easy one person procedure.

According to another aspect of the present invention, the hoop frame shelter system uses 2⅜" pipe as bunk headers to allow cattle safe access to the feed bunk.

According to another aspect of the present invention, the hoop frame shelter system uses 1" sucker rod located 1' above the bunk header pipe to prevent cattle from jumping over and into the feed bunk.

According to another aspect of the present invention, the hoop frame shelter system uses Ag lime #3 to be placed over the 24' wide ground area 4" deep to seal the ground from manure penetration and to act as a moisture barrier to keep the bedding pack dry.

According to another aspect of the present invention, the hoop frame shelter system uses straw, corn stover and bean stover as bedding above the limestone layer. Approximately ½ of a 1200# round bale of bedding is required for each animal during a 100 day feeding period.

According to another aspect of the present invention, the hoop frame shelter system's bedding pack is removed with a front end loader after each pen of cattle have been marketed. The bedding pack will make a dry compost and can be stacked outside the structure in a compost pile until the farmer has crop ground available to spread the dry odor free fertilizer.

According to another aspect of the present invention, the hoop frame shelter system uses the bedding compost pile to compost any dead animal as fly-free, odor-free compost that can later be spread on crop ground as composted fertilizer.

Each of the previously discussed features and aspects are variable options that can be used singly or in combination with some or all of the other mentioned features to provide maximum operator flexibility to assure dry animals maintained in their thermo neutral zone to achieve maximum weight gain and feed efficiency.

Figure 1:
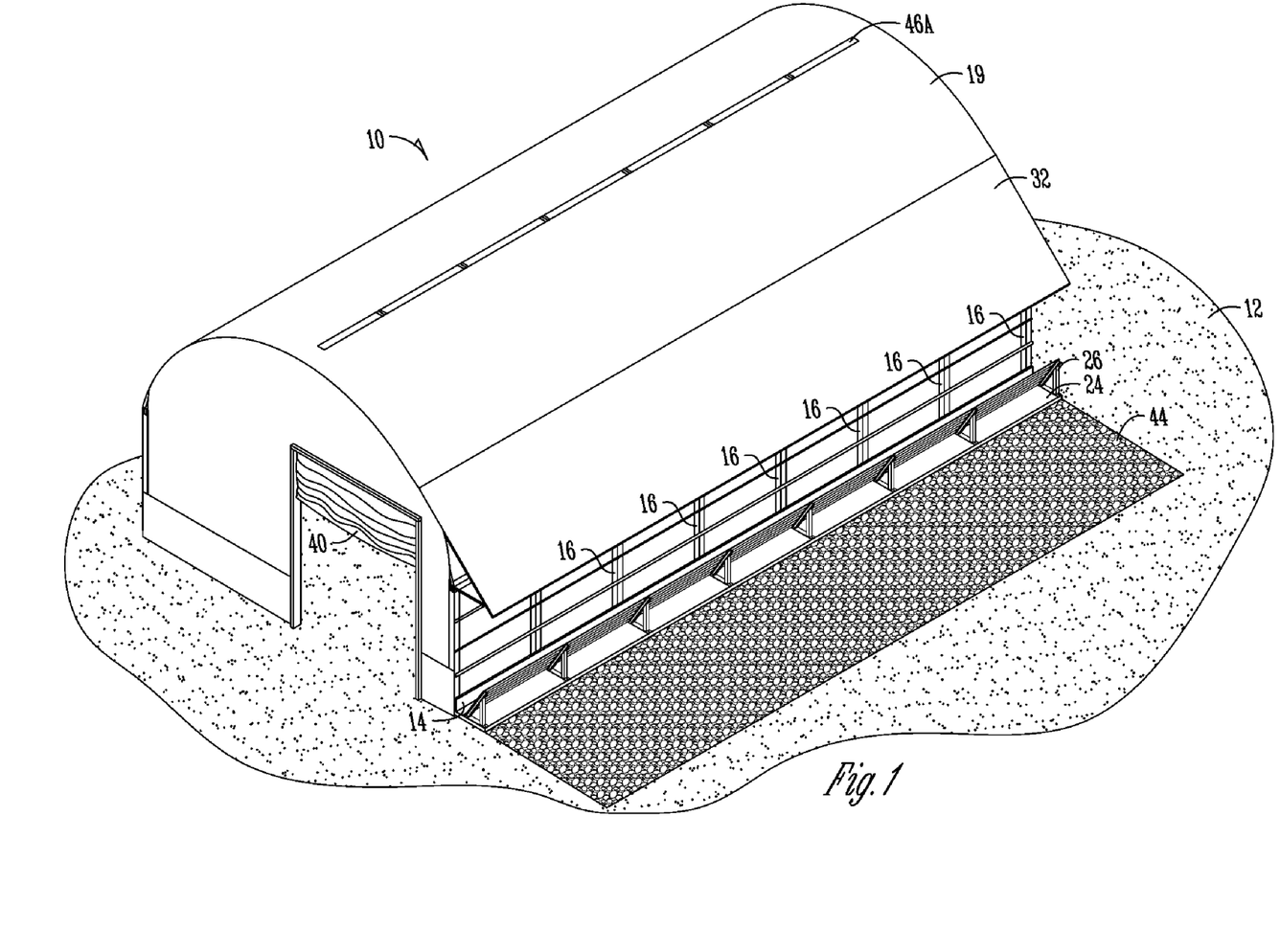
FIG. 1 is a perspective view of a normally south facing side of a cattle feeding shelter of the present invention.

Referring now more particularly to the drawings by character reference, FIG. 1 discloses the animal shelter 10 looking at a perspective view of the south facing side. The shelter 10 is generally positioned on the ground 12 and comprises a wooden foundation perimeter frame 14 which has spaced apart frame beams 16 extending upwardly from the ground about 10'. Frame posts or beams 16 are anchored 4' into the ground. This 10' spacing allows for maximum ventilation and freedom from moisture condensing on the ceiling. A one foot opening 46a in the top of roof (chimney split) in the center of the building is to allow the heat and moisture to vent out the top, as later explained in conjunction with FIG. 8.

Figure 4:
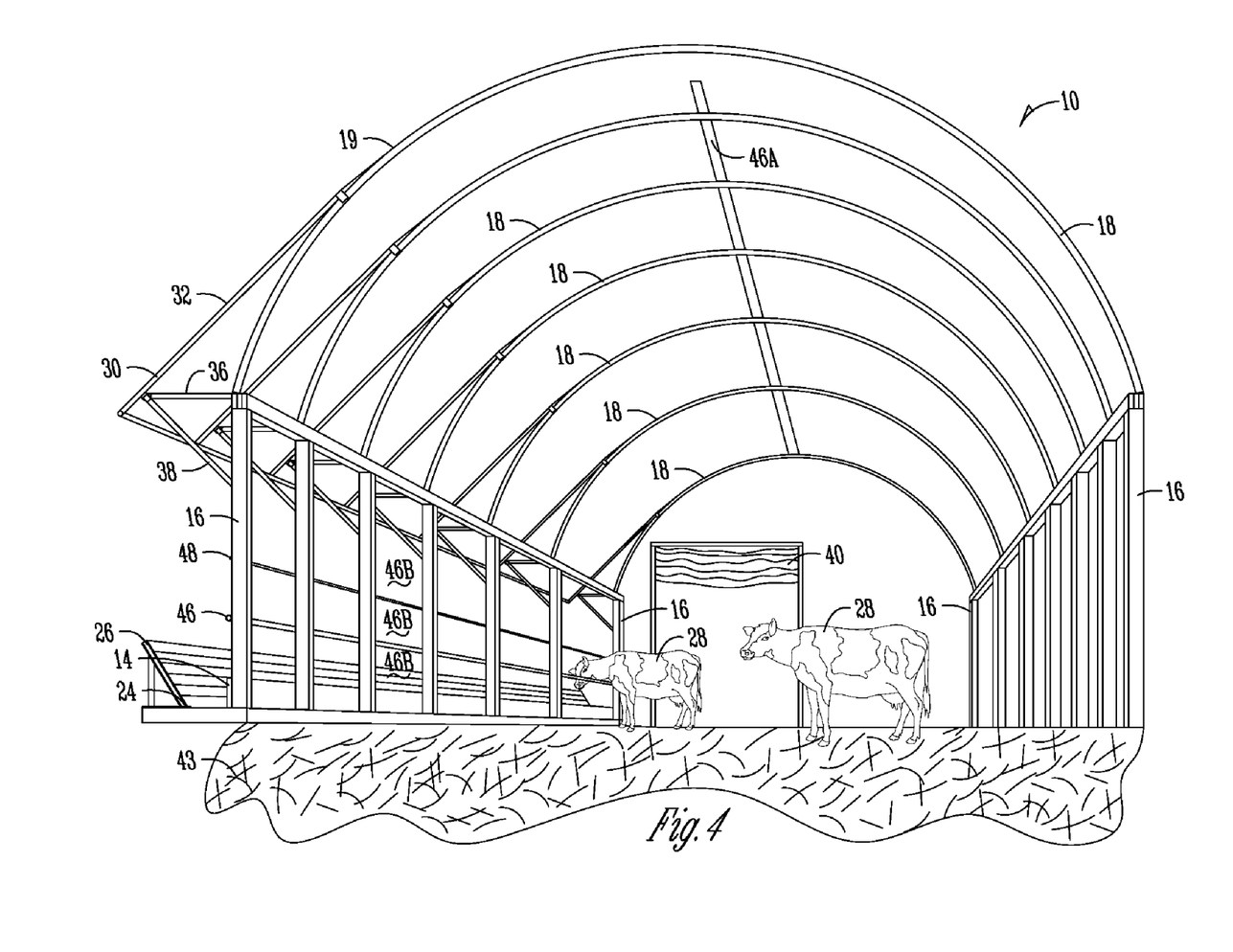
FIG. 4 is an end view looking through the shelter from east to west showing the north end enclosed and the south end open.
Figure 5:
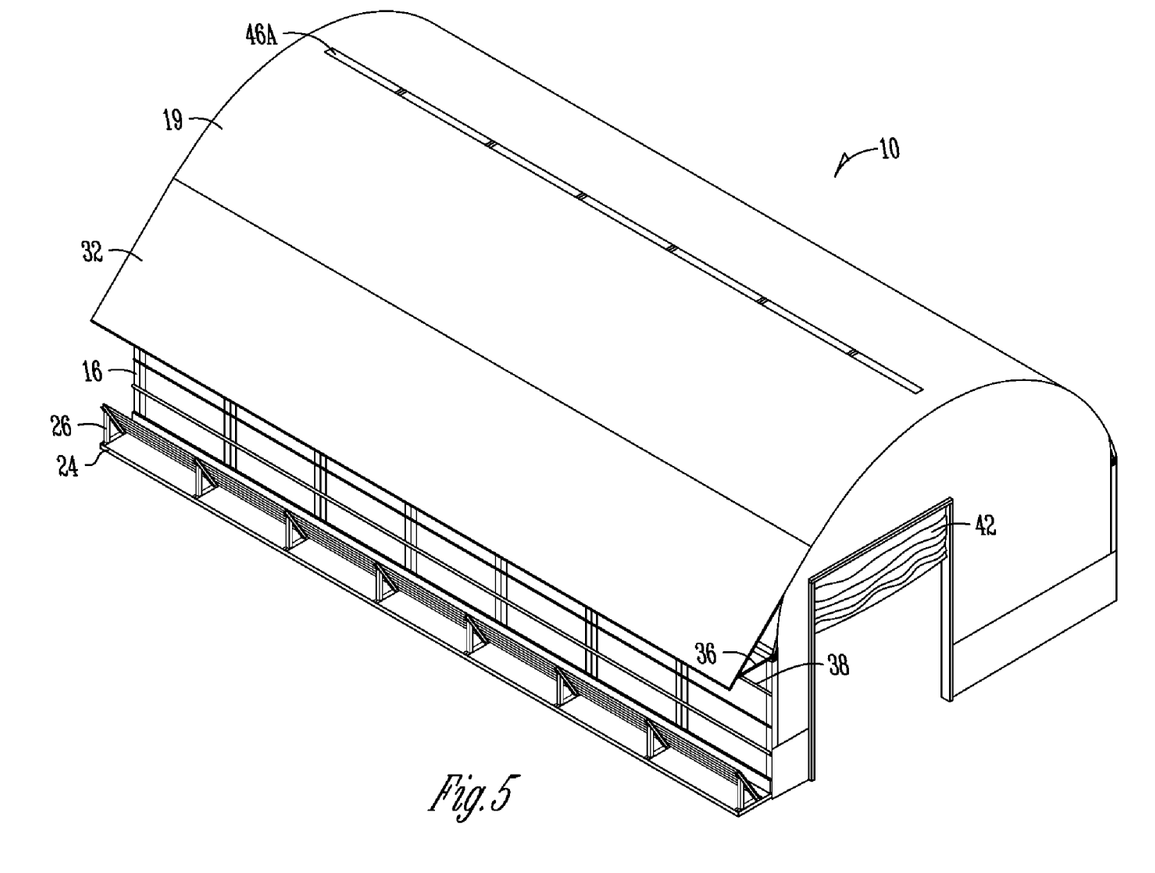
FIG. 5 is a perspective view of the normally south facing wall and showing the associated animal feed bunker, as well as the east end.

Frame beams or posts 16 have a hoop awning structure frame 18 extending upwardly from the frame beams 16 and over the top to form an awning frame extending from the south side up and across over to the north side corresponding frame beams 16. Covering 19 is extended over the awning frame and secured to it by any suitable means such as ties, snaps, hooks, etc. The covering 19 is flexible, non metal and can be a natural material such as canvas or flexible polymer plastics like polyvinyl chloride, polyester, coated or uncoated. Wooden frame 14 is anchored to a substantially flat (on the interior portion) cement floor or concrete slab 20. In a preferred embodiment, concrete slab 20 has an interior flat portion and extends to a sloped interior portion 22 which terminates in a stepped up exterior flat portion 24. Preferably this step is 6" (see FIG. 2). This prevents animals from defecating into the feed box or bunker 26 as earlier explained. Feed bunker 26 is attached to the exterior portion of frame beams 16 along the outside of the beams. In this manner, animals 28 inside of the shelter 10 can stick their heads out facing south and feed from the feed bunker 26 (see FIG. 4).

Figure 6:
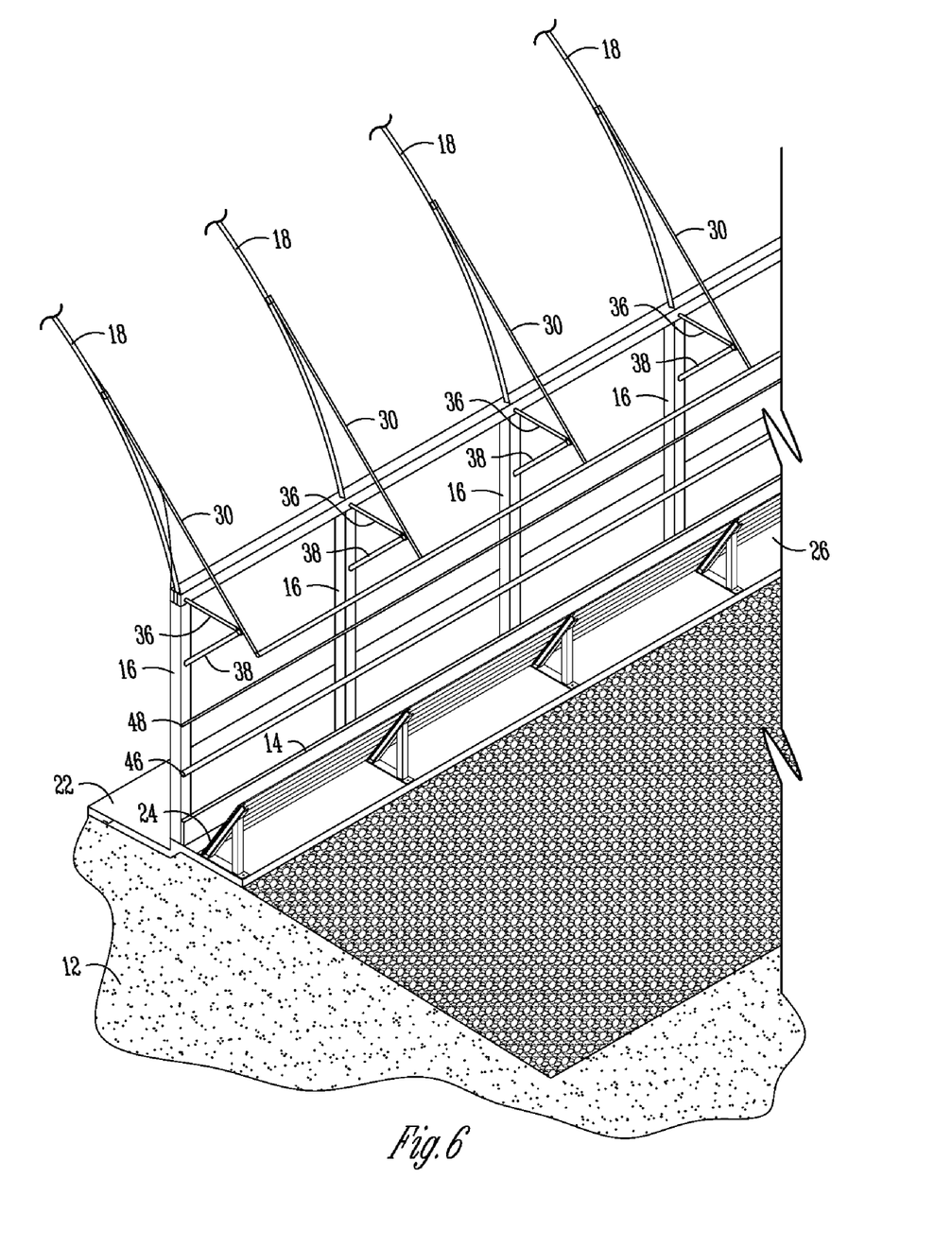
FIG. 6 shows a perspective view of the awning frame extension over the normally south facing wall.
Figure 7:
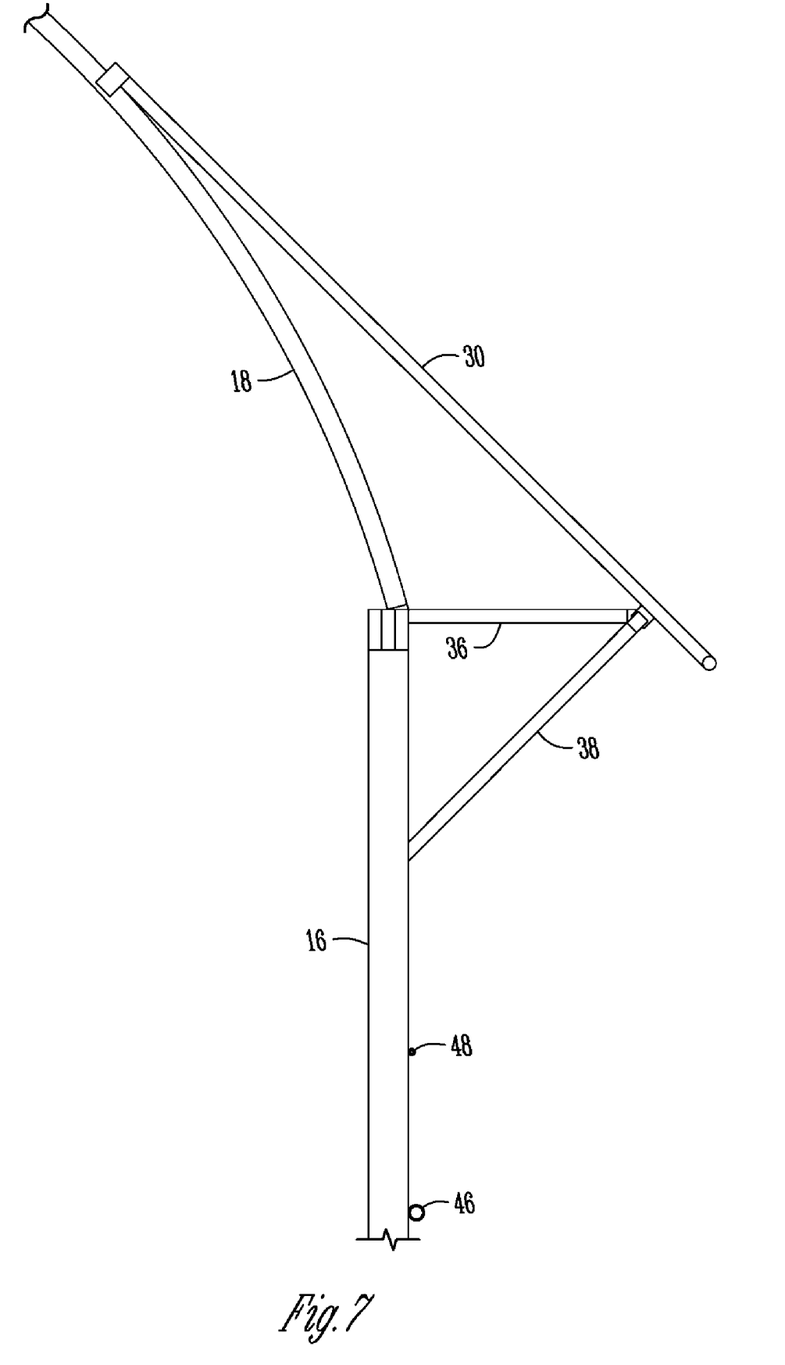
FIG. 7 shows a close-up end view of the details of the normally south facing retractable awning's frame.

Again looking at the south side (see FIG. 6), the awning frame 30 extends out from the awning hoop structure 18 and over the feed bunker 26. The awning 32 positioned on awning frame 30 is a 4' awning which actually is part of the roof on the south side and extends over the feed bunk to prevent snow and rain from falling in the feed bunk and spoiling feed. Awning frame 30 has support stints 36 and 38. In the summer the awning 32 also functions to provide shade. In the winter, it may be rolled up to provide sun into the south side for warmth. The north side also has a vertical rollup cover 39 positioned vertically up to the 10' level which may be rolled or unrolled selectively to provide warmth when it is down and ventilation when it is up. The east and west ends have two 16' wide by 14' high rollup doors 40 and 42 to allow easy access to the structure. Bedding material (not depicted) may be placed on the limestone floor 45. The doors 40 and 42 may be rolled up for scooping or cleaning with a front end loader after each pen of cattle has been sent to market. Scooped out bedding material will make a dry compost that can be stacked outside of the structure for a compost pile available to spread on crop ground.

Figure 2:
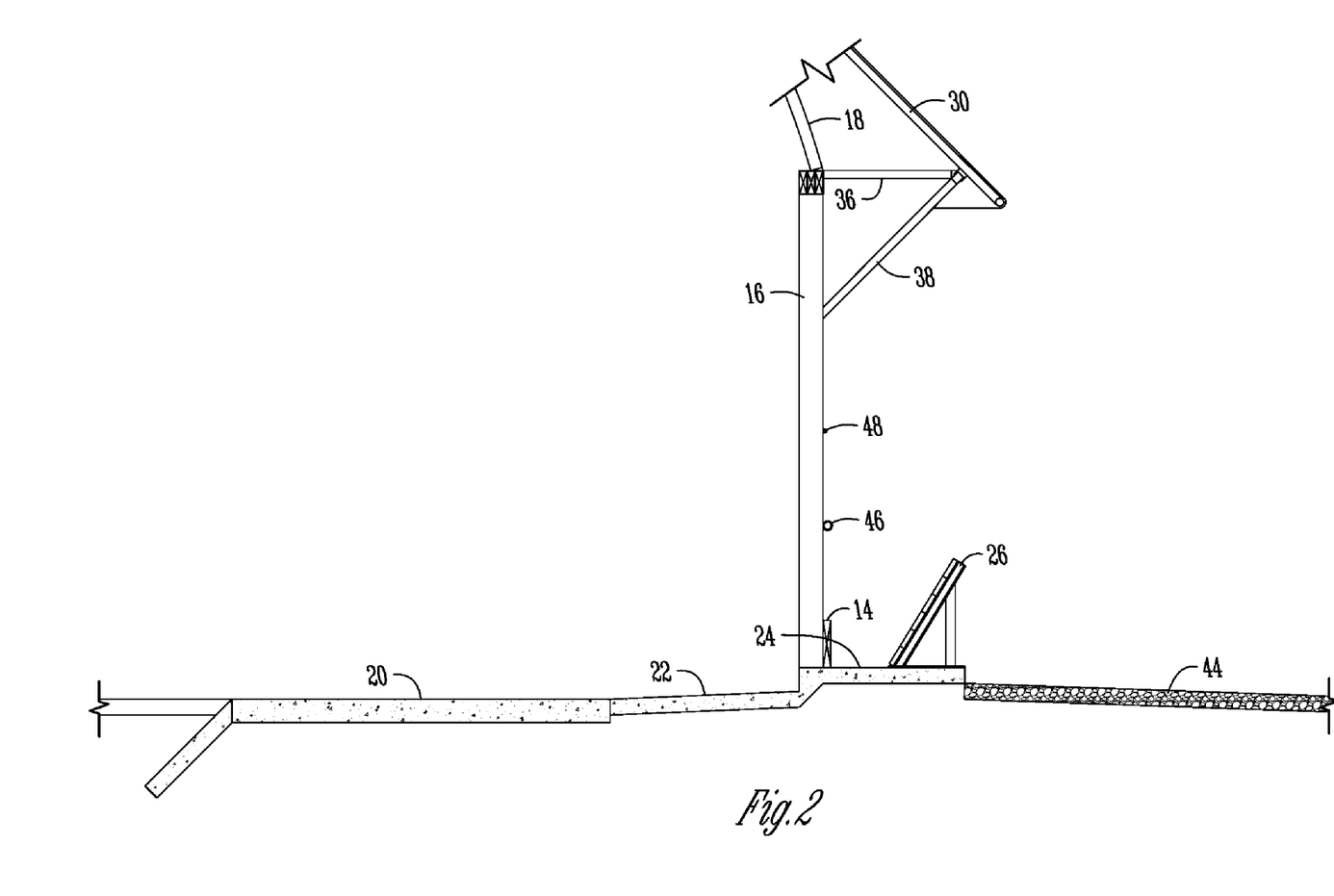
FIG. 2 is a sectional view through the south wall of the shelter of FIG. 1.

Certain constructional features relating to the position of the shelter 10 on the ground are worthy of consideration and mentioned herein. As seen in FIG. 2, agricultural limestone 45 is placed over a 24' wide ground area 4' deep in the building to seal the ground from manure penetration and to act as a moisture barrier to keep the bedding pack dry. The system uses straw, corn stover, and bean stover as bedding above the limestone layer. Bunk header pipe 46 is attached to frame posts 16 to allow cattle safe access to the feed bunk 26, and sucker rod 48 is positioned about one foot above header pipe 46 to prevent cattle into the feed bunk 26. Crushed rock 44 is placed 10 ft wide in front of bunk for a feed truck to drive on to deliver feed to the feed bunk 26.

Figure 3:
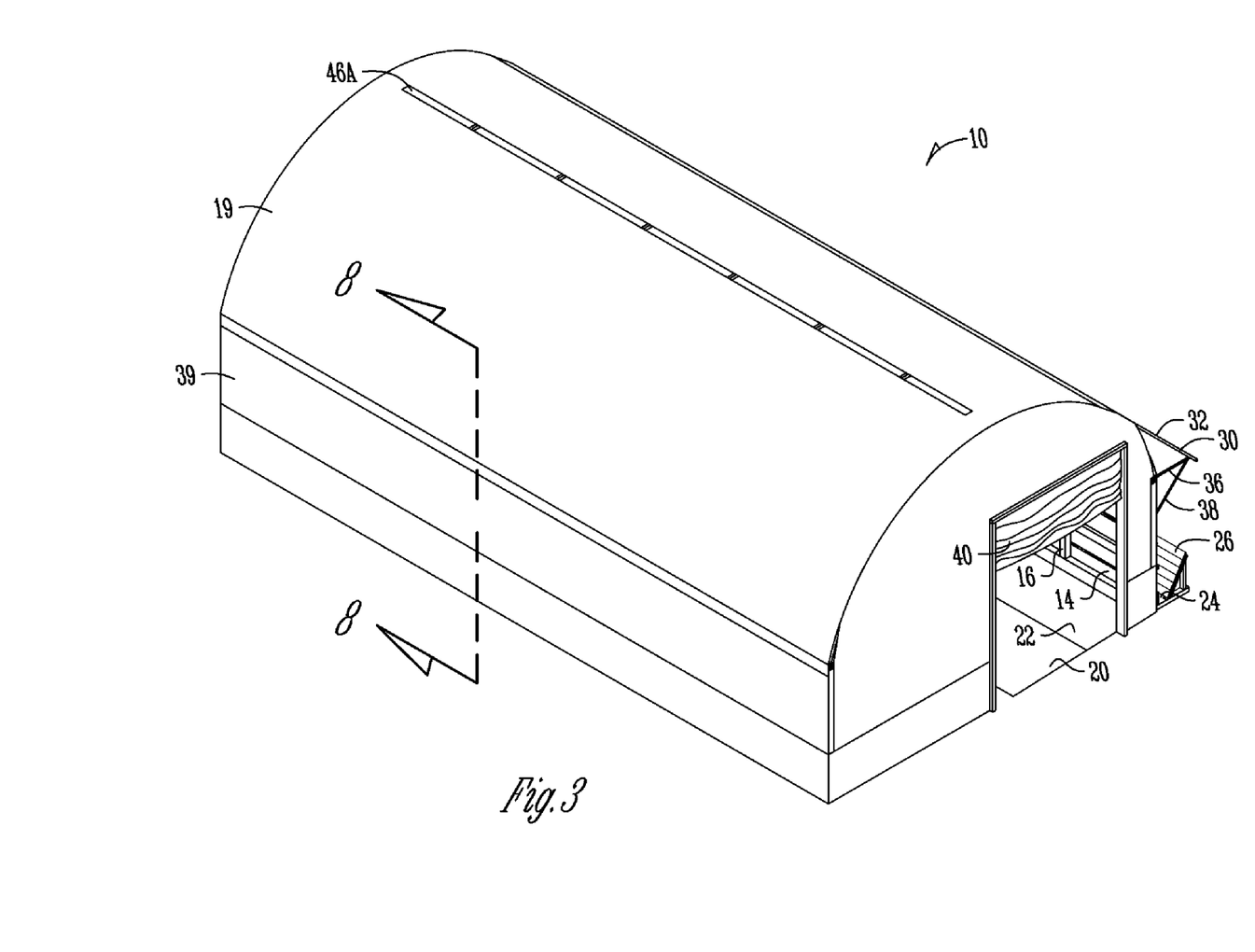
FIG. 3 is a perspective view showing the east facing end looking through and out the south facing end.
Figure 8:
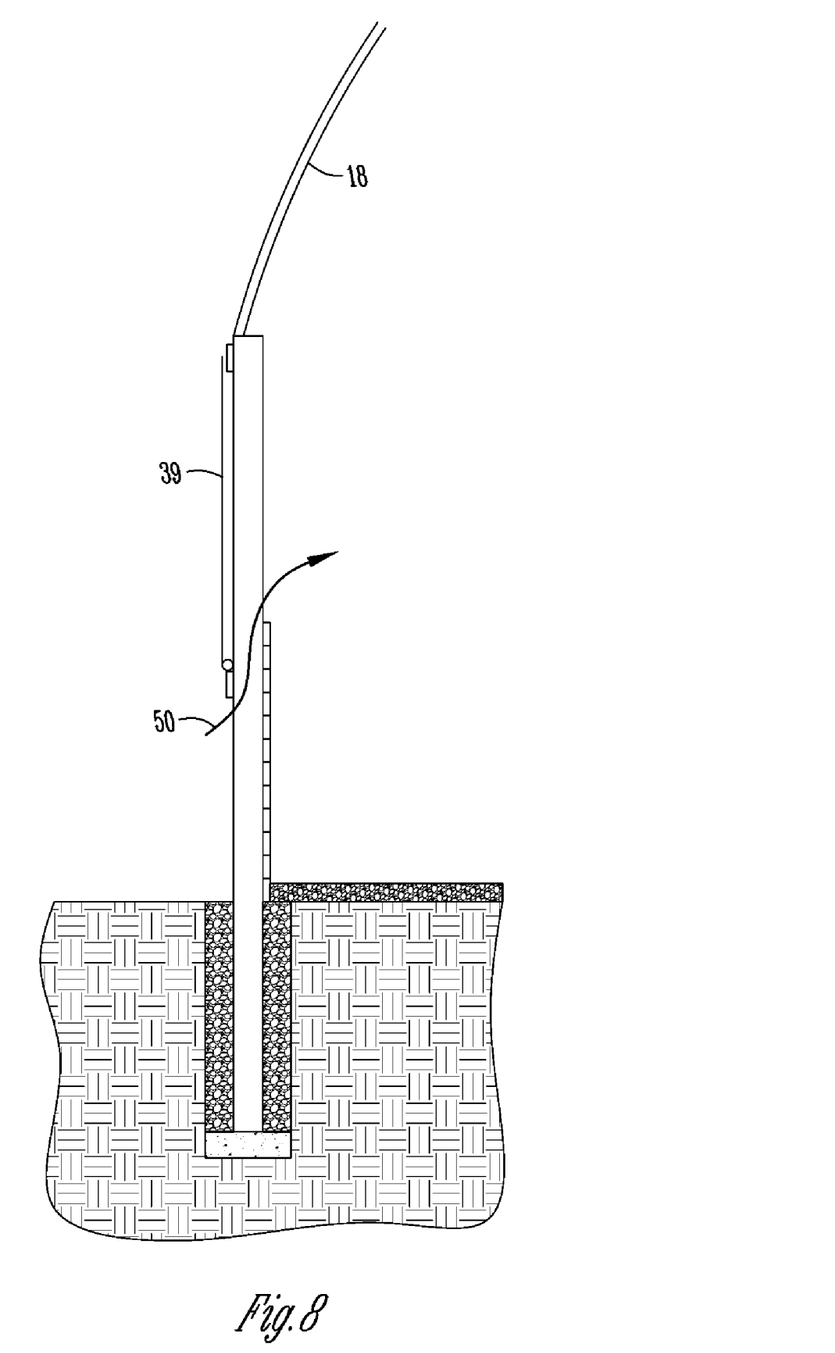
FIG. 8 is a section through the normally north facing wall showing how it assists in ventilation.

The normally north facing wall is best seen in perspective in FIG. 3. A sectional view through it is shown in FIG. 8 to illustrate the draft gap (see arrow 50). In operation, fresh air hitting the north wall is swept through the draft gap along the line of directional arrow 50. Once inside it is swept up and through chimney split 46 due to the Chimney Draw Effect. Air coming into the large opening 46B creates air movement to smaller opening 46A due to the Venturi Effect of air picking up speed from a large opening to a small opening.

One standing near the north facing wall can feel the strong air intake draft. This performs several important functions. First, any moist or steam-like air is swept up and out chimney split 46A. Secondly, dry air is swept inside the structure along the draft gap (see arrow 50). Third, the animals stay within the thermo neutral temperature zone and out of any wind chill, and fourth, the interior is kept dry due to the air circulation.

Water is removed from the surface of the Earth to the atmosphere by two distinct mechanisms: evaporation and transpiration. Evaporation can be defined as the process where liquid water is transformed into a gaseous state. Transpiration is the process of water loss from plants through stomata. Stomata are small openings found on the underside of leaves that are connected to vascular plant tissues. In most plants, transpiration is a passive process largely controlled by the humidity of the atmospheric and the moisture content of the soil.

It is often difficult to distinguish between evaporation and transpiration. So we use composite term Evapotranspiration. The rate of Evapotranspiration at any instant from the Earth's surface is controlled by four factors:

Energy availability. The more energy available the greater the rate of Evapotranspiration. It takes about 600 calories of heat energy to change 1 gram of liquid water into a gas.

The humidity gradient away from the surface. The rate and quantity of water vapor entering into the atmosphere both become higher in drier air.

The wind speed immediately above the surface. Many of us have observed that our gardens need more watering on windy days compared to calm days when temperatures are similar. This fact occurs because wind increases the potential evapotranspiration. The process of evapotranspiration moves water vapor from ground or water surfaces to an adjacent shallow layer that is only a few centimeters thick. When this layer becomes saturated evapotranspiration stops. However, wind can remove this layer replacing it with drier air which increases the potential for evapotranspiration.

Water availability. Evapotranspiration cannot occur if water is not available.

Evapotranspiration Rate for any specific area of the United States may be found on the D.T.N. Ag Weather forecast by entering City, State and Zip Code. The Evapotranspiration Rate depends on temperature, relative humidity and wind speed. The rate is expressed per day in inches of moisture removed. The average range in the Evapotranspiration Rate is 0.00 inches to 0.40 inches per day.

The moisture removed in the system here described that allows 40 sq. ft per animal can be calculated. For example on Sunday Oct. 15, 2006, the Evapotranspiration Rate in Northwest Iowa was 0.20 inches based on a temperature of 60° F., 40% relative humidity and a wind speed of 10 miles per hour.

144 sq. inches×40×0.20=152 cubic inches of moisture removed/head/day 1 cubic foot=1728 cubic inches
1 cubic foot=7½ gallons of water
1 gallon of water=230 cubic inches of water
1152 cubic inches of water removed divided by 230 cubic inches=5 gallons of water (0.10 Evapotranspiration Rate equals 2½ gallons of water removed over 40 sq. ft. area). Assuming cattle drink 5-10 gallons of water per day depending on temperature and size of cattle, 60% of that water is excreted as urine. For example, 8 gallons of water consumed× 60%=4.8 gallons of urine produced/head/day. Thus on Oct. 15, 2006 in Northwest Iowa with an Evapotranspiration Rate of 0.20 inches the System with a 1000# animal would have been dry with more moisture removed than excreted.

The operation of the present System is based on the Evapotranspiration Rate. The Venturi Effect and the Chimney Effect will create air movement in the building even when there is no wind. This adds to the drying effect. The rate of drying depends on the temperature and relative humidity. On an average day with an Evapotranspiration Rate of 0.20 inches the barn will be dry. If the rate drops below 0.20 inches the excess moisture and manure is removed by scrapping the concrete pad with a box scraper and adding bedding to the pack area to absorb the excess moisture and manure.

As an estimated example in Northwest Iowa with 1000# animal one would expect to scrape the pad on average every 10 days and add bedding on the same schedule, depending on time of year and actual Evapotranspiration Rate. The bedding required for a 600 head building would be approximately 500 large round cornstalk bales per year depending on size of animals and the Evapotranspiration Rate for the specific location.

Figure 9:
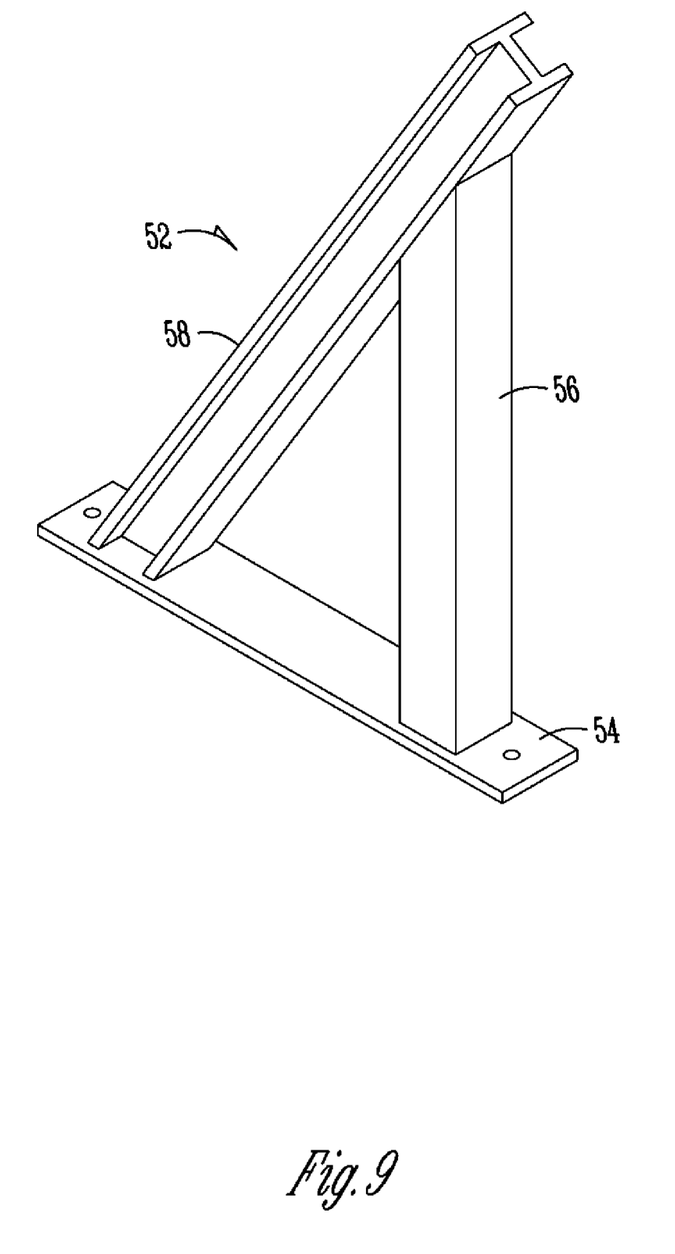
FIG. 9 shows the bunk bracket configuration.

FIG. 9 shows the details of the feed bunk brackets 52, illustrated along the front of feed bunker 26. Bracket 52 is comprised of a base 54 which bolts or anchors to a concrete slab. At its outer end base 54 is attached to an upright post 56, angularly disposed from the inner end of base 54 to the top of post 56, is angular bracket 58. Bunker boards are then slid into to angular bracket 58. They may be conveniently removed as needed for replacement boards.

Figure 10:
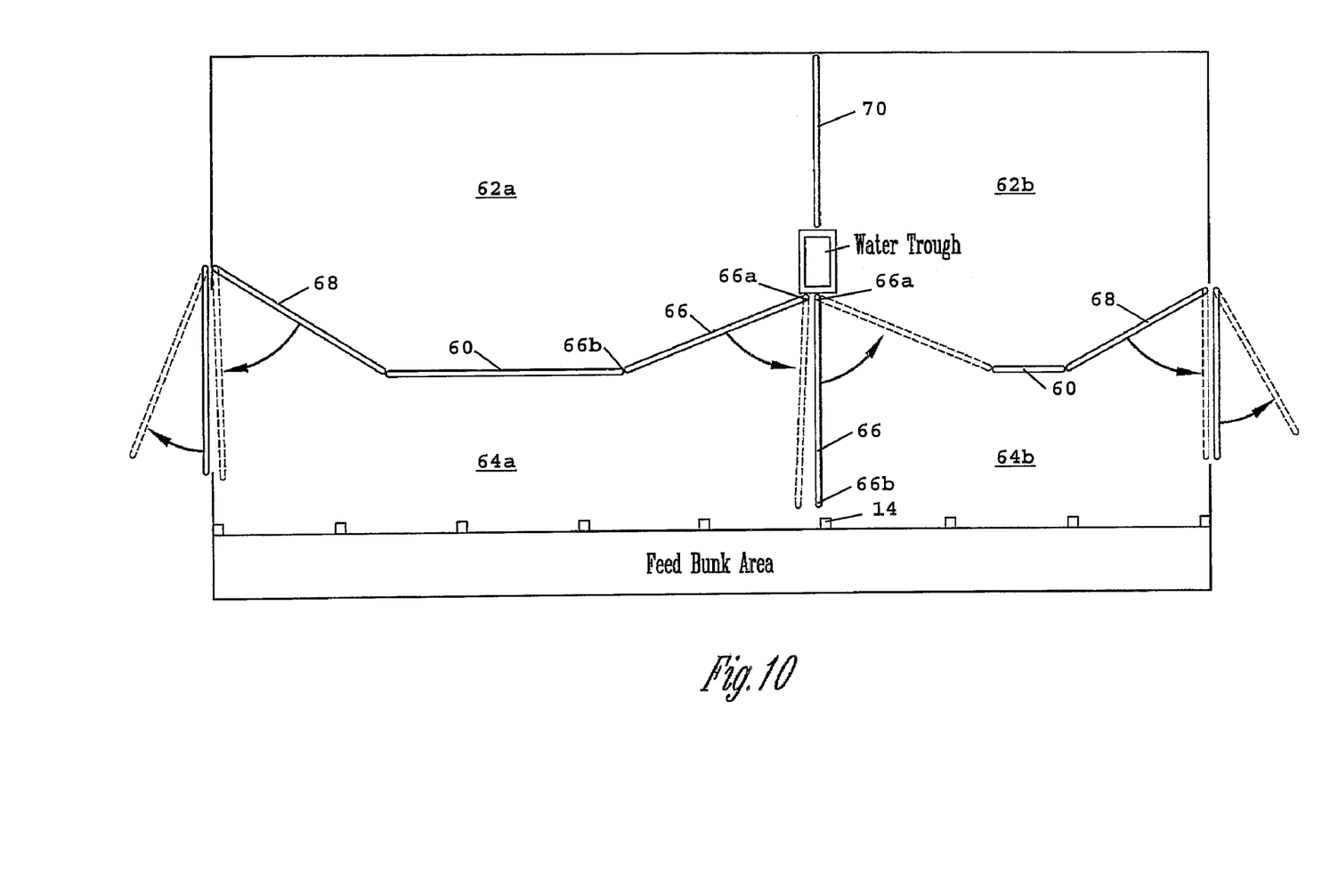
FIG. 10 shows a top view of the drover's alley configuration.

FIG. 10 is a top schematic view of the drover's alley configuration which may be placed within the interior of the building in order to control animal 28 movements. As shown there is one or more permanent perimeter fences 60 spaced apart and extending lengthwise which divides the interior into dry bedding pack zones 62a, 62b and cement floor covered drover's alleys 64a, 64b with double hinged gates 66, 68. The gates 66, 68 are mounted between the permanent fences 60 with each gate having a hinged attachment end 66a and a distal end 66b. The hinged attachment ends 66a are positioned in close proximity with each other to allow each gate 66, 68 to independently rotate through generally the same space so that each gate 66, 68 has a first position wherein the gate 66, 68 forms a barrier with one of the first permanent fences 60, a second position wherein the gate 66, 68 forms a barrier with the foundation frame 14, and a third position wherein the gate 66, 68 forms a barrier with the other permanent fence 60. The gates 66, 68 may be closed and interior confined dry bedding zone 62 shut off or opened to allow access to drover's alley 64. A barrier such as fence 70 is located between perimeter fences 60 and is used to help divide adjacent bedding zones 62a, 62b. As a result animals may be confined in dry bedding area 62a, 62b while the drover's alley 641, 64b is conveniently cleared by a working tool such as a blade, front end loader or the like. After cleaning the double hinged gates 66, 68 may be opened to allow cattle access to the feed bunk area adjacent the drover's alleys 64a, 64b.

It can therefore be seen that the hoop frame system creates a controlled environment. The hoop frame system has a roof providing protection from the weather elements. The system has rollup curtains for ventilation in summer and they are rolled down for protection from wind chill in winter. The system has feed bunks, water, bedding pack and a concrete scrape alley under one roof. The system has gating and rollup doors to allow access for bedding, cleaning and moving cattle. The method utilizes the steps in a hoop frame system that promotes cattle to utilize their natural instincts to seek shade, to seek out wind protection, to keep their hair coat dry, to stay off frozen lumpy ground, to lie down on a dry bedding pack, to stay in small groups and to seek a quiet protected area to ruminate and rest. The hoop frame shelter system allows cattle to be fed in a controlled environment without the associated pollution of water and air that open feedlots create with manure runoff from rain and snow melt. It therefore can be seen it accomplishes all of its intended objects.

What is claimed is:

1. A feed lot shelter to be positioned on the ground for confined animals having an interior configuration for helping to control the movement of animals, said shelter comprising:
    a building foundation frame extending upwardly from the ground, said building foundation frame having a north side, a south side, an east end, and a west end; an awning hoop frame extending upwardly from the foundation frame and over it; an awning extending over the awning hoop frame to define a roof having a chimney split, said roof at least partially enclosing said shelter; said awning having a normally north wall vertical portion with a draft gap, and a normally-south wall vertical portion, each of which can be optionally opened or closed to selectively allow air ventilation, wind protection or catching the warmth of southern sun exposure; said awning hoop frame having a frame portion that extends outwardly to the south over the foundation frame to support an extendable awning that may hangs over the south foundation frame; vertically extendable and retractable awning closures over the east and west ends of said frame to form selective entrances and exits;
    a first permanent fence for helping to divide a first dry bedding pack zone and a first drover's alley;
    a second permanent fence spaced apart from and generally parallel to the first permanent fence, said second permanent fence for helping to divide a second dry bedding pack zone and a second drover's alley;
    a feed bunk area adjacent to the first and second drover's alley, said feed bunker mounted on the south side of the foundation frame under said extendable awning;
    two double hinged gates mounted between the permanent fences, each gate having a hinged attachment end and a distal end, wherein the hinged attachment ends are positioned in close proximity with each other to allow each gate to independently rotate through generally the same space, and wherein each gate has a first position wherein it forms a barrier with the first permanent fence or the second permanent fence to confine animals in the dry bedding pack zone and a second position wherein it forms a barrier with the foundation frame to allow animals access to the feed bunk area.

2. The shelter of claim 1 which has a substantially flat partial cement floor and a partial deep bedded area over a limestone base.

3. The shelter of claim 2 wherein said cement floor extends out around the normally south perimeter of the foundation frame, partially sloping away from the frame.

4. The shelter of claim 1 wherein the feed bunker is formed from bunker brackets and removable, slide in slats.

5. The shelter of claim 1 wherein the vertically extendable and retractable closures over the east and west ends are roll up doors.

6. The feed lot shelter of claim 1 wherein the reef awnings is a flexible material selected from the group consisting of canvas, and polymer plastics.

7. The feed lot shelter of claim 6 wherein the polymer material is reflective white in color.

8. A feed lot shelter to be positioned on the ground for confined animals having an interior configuration for helping to control the movement of animals, said shelter comprising:
   a building foundation frame extending upwardly from the ground, said building foundation frame having a north side, a south side, an east end, and a west end; an awning hoop frame extending upwardly from the foundation frame and over it; an awning extending over the awning hoop frame to define a roof having a chimney split, said roof at least partially enclosing said shelter; said awning having a normally north wall vertical portion with a draft gap, and a normally-south wall vertical portion, each of which can be optionally opened or closed to selectively allow air ventilation, wind protection or catching the warmth of southern sun exposure; said awning hoop frame having a frame portion that extends outwardly to the south over the foundation frame to support an extendable awning that may hangs over the south foundation frame; vertically extendable and retractable awning closures over the east and west ends of said frame to form selective entrances and exits; a feed bunker mounted on the south side of the foundation frame under said extendable awning;
   a first permanent fence for helping to divide a first dry bedding pack zone and a first drover's alley;
   a second permanent fence spaced apart from and generally parallel to the first permanent fence, said second permanent fence for helping to divide a second dry bedding pack zone and a second drover's alley;
   two double hinged gates mounted between the permanent fences, each gate having a hinged attachment end and a distal end, wherein the hinged attachment ends are positioned in close proximity with each other to allow each gate to rotate through generally the same space, and wherein each gate is adapted to move independent from the other gate between a first position wherein the gate forms a barrier with the first permanent fence, a second position wherein the gate forms a barrier with the foundation frame, and a third position wherein the gate forms a barrier with the second permanent fence.

9. The shelter of claim 8 said feed bunk being adjacent to the drover's alley.

10. A feed lot shelter to be positioned on the ground for confined animals having an interior configuration for helping to control the movement of animals, said shelter comprising:
    a building foundation frame extending upwardly from the ground, said building foundation frame having a north side, a south side, an east end, and a west end; an awning hoop frame extending upwardly from the foundation frame and over it; an awning extending over the awning hoop frame to define a roof having a chimney split, said roof at least partially enclosing said shelter; said awning having a normally north wall vertical portion with a draft gap, and a normally-south wall vertical portion, each of which can be optionally opened or closed to selectively allow air ventilation, wind protection or catching the warmth of southern sun exposure; said awning hoop frame having a frame portion that extends outwardly to the south over the foundation frame to support an extendable awning that may hangs over the south foundation frame; vertically extendable and retractable awning closures over the east and west ends of said frame to form selective entrances and exits; a feed bunker mounted on the south side of the foundation frame under said extendable awning;
    a first permanent fence for helping to divide a first dry bedding pack zone and a first drover's alley;
    a second permanent fence spaced apart from and generally parallel to the first permanent fence, said second permanent fence for helping to divide a second dry bedding pack zone and a second drover's alley;
    two double hinged gates mounted between the permanent fences, each gate having a hinged attachment end and a distal end, wherein the hinged attachment ends are positioned in close proximity with each other to allow each gate to rotate through generally the same space, and wherein each gate is adapted to move independent from the other gate between a first position wherein the gate forms a barrier with the first permanent fence, a second position wherein the gate forms a barrier with the foundation frame, and a third position wherein the gate forms a barrier with the second permanent fence;
    a third permanent fence in-between and generally perpendicular to the first and second permanent fence to help divide the first dry bedding pack zone from the second dry bedding pack zone, said third permanent fence have a first end forming a barrier with the foundation frame and a second end extending toward the hinged attachment ends of the gates.

11. The shelter of claim 10 said feed bunk being adjacent to the drover's alley.

\* \* \* \* \*